Patented Jan. 1, 1929.

1,697,295

UNITED STATES PATENT OFFICE.

ROBERT HUBBARD VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS.

ESTERS OF HYDROGENATED AROMATIC ALCOHOLS.

No Drawing. Application filed November 21, 1927. Serial No. 234,911.

This invention relates to new and useful compositions of matter comprising an ester of a hydrogenated aromatic alcohol with a monocarboxylic acid of such molecular weight that the ester is substantially non-volatile at ordinary temperatures. Examples of my invention are the cyclohexyl esters of lauric, myristic, palmitic, oleic, ricinoleic, stearic, benzoic or salicylic acid, the esters of hexa-hydro-benzyl alcohol with each of the above acids, and the corresponding esters of hexa-hydro-tolyl alcohol.

These esters are soluble in certain organic solvents including alcohol, from which many of them may be crystallized on cooling a hot, saturated solution. The esters of the saturated fatty acids containing 16 or more carbon atoms are solid at winter temperatures.

The esters may be prepared by esterfying the hydrogenated alcohol with the acid whose radical it is desired to have in the finished ester. The esterification is preferably made at a temperature below that of rapid volatilization of the reacting substances but much above the boiling point of water. Elimination of the water formed in the reaction, as by fractionation or removal in a stream of inert gas passed through the reaction vessel, favors more complete esterification.

In making cyclohexyl stearate, for example, the following procedure has given good results. One molecular proportion of stearic acid is mixed with one and one-half molecular proportions of cyclohexanol, to give a 50% excess of the alcohol (cyclohexanol) above the amount required theoretically to combine with the stearic acid, according to this equation:

The mixture is heated in oil at a temperature of 180° C. for 2 hours and then at 200° to 220° C. for a total of 18 hours, while a slow stream of carbon dioxide or nitrogen is bubbled through the material and allowed to escape through a short vertical air-cooled tube leading from the top of the reaction vessel. During this 18 hours' heating, one-half molecular proportion of cyclohexanol is added at the end of the 6th hour and the same amount again at the end of the 12th, in order that there may be a large excess of cyclohexanol. This excess of cyclohexanol is readily separated from the resulting cyclohexyl stearate by fractionation, whereas if there had been used an excess of stearic acid, of very high boiling point, it would not be so conveniently separable.

At the conclusion of the 18 hours' esterification the mixture in the reaction vessel, while still warm, is transferred to a still provided with a relatively small and well insulated fractionating column. Here the material is distilled under reduced pressure. The first fraction contains most of the excess of cyclohexanol, the second fraction contains much cyclohexyl stearate and some free stearic acid, and the last fraction is nearly pure cyclohexyl stearate.

Cyclohexyl stearate as existing in the last fraction may be purified by melting and dissolving in 20% of its weight of hot denatured alcohol, formula 2B, cooling slowly until about half of the mass has crystallized and then removing the mother liquor. Recrystallizations may be made in a similar manner.

Cyclohexyl stearate is a fat-like substance that is colorless in the liquid state but is a white solid at or below 25° C. It can be distilled at 232° C. at a pressure equal to approximately 8 mm. of mercury.

By using another hydrogenated alcohol than cyclohexanol, one skilled in the art may make similarly other stearates. Likewise, by using another monocarboxylic acid than stearic in the reaction above, one may make esters of other acids.

By the term "hydrogenated aromatic alcohol", as used in the specifications and claims, I means the compound formed by adding an even number of hydrogen atoms to an aromatic alcohol, such as phenol, tolyl alcohol, or benzyl alcohol. Examples of what I mean by the term are Hydrogenated phenol—

Hydrogenated tolyl alcohol—

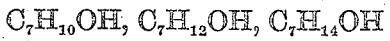

Hydrogenated benzyl alcohol—

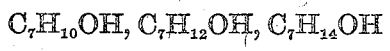

The esters of hydrogenated aromatic alcohols with mono-carboxylic acids containing 7 carbon atoms or more to each molecule of acid volatilize very slowly or substantially not at all at ordinary temperatures. These esters are, therefore, useful as fixatives of more volatile substances or as an ingredient of lacquers, particularly as solvents for many of the resins commonly used in lacquers.

I claim:

1. A composition of matter comprising an ester of a hydrogenated aromatic alcohol with a monocarboxylic acid, said acid containing more than seven carbon atoms to the molecule.

2. A composition of matter comprising an ester of a hydrogenated aromatic alcohol with an aliphatic, monocarboxylic acid, said acid containing more than seven carbon atoms to the molecule.

3. A composition of matter comprising an ester of a hydrogenated aromatic alcohol with stearic acid.

4. A composition of matter comprising an ester of cyclohexanol with a monocarboxylic acid, said acid containing more than seven carbon atoms to the molecule.

5. A composition of matter comprising an ester of cyclohexanol with an aliphatic, monocarboxylic acid, said acid containing more than seven carbon atoms to the molecule.

6. Cyclohexyl stearate, a white solid at temperatures below 25° C., a colorless liquid when molten, and a material boiling at 232° C. at a presure equal approximately to 8 mm. of mercury.

7. A composition of matter comprising an ester of a hydrogenated aromatic alcohol with a saturated monocarboxylic acid, said acid containing more than seven carbon atoms to the molecule.

8. A composition of matter comprising an ester of cyclohexanol with a saturated monocarboxylic acid, said acid containing more than seven carbon atoms to the molecule.

9. A composition of matter comprising an ester of a hydrogenated aromatic alcohol with a saturated aliphatic, monocarboxylic acid, said acid containing more than seven carbon atoms to the molecule.

10. A composition of matter comprising an ester of cyclohexanol with a saturated aliphatic, monocarboxylic acid, said acid containing more than seven carbon atoms to the molecule.

ROBERT HUBBARD VAN SCHAACK, Jr.